Figure 1:
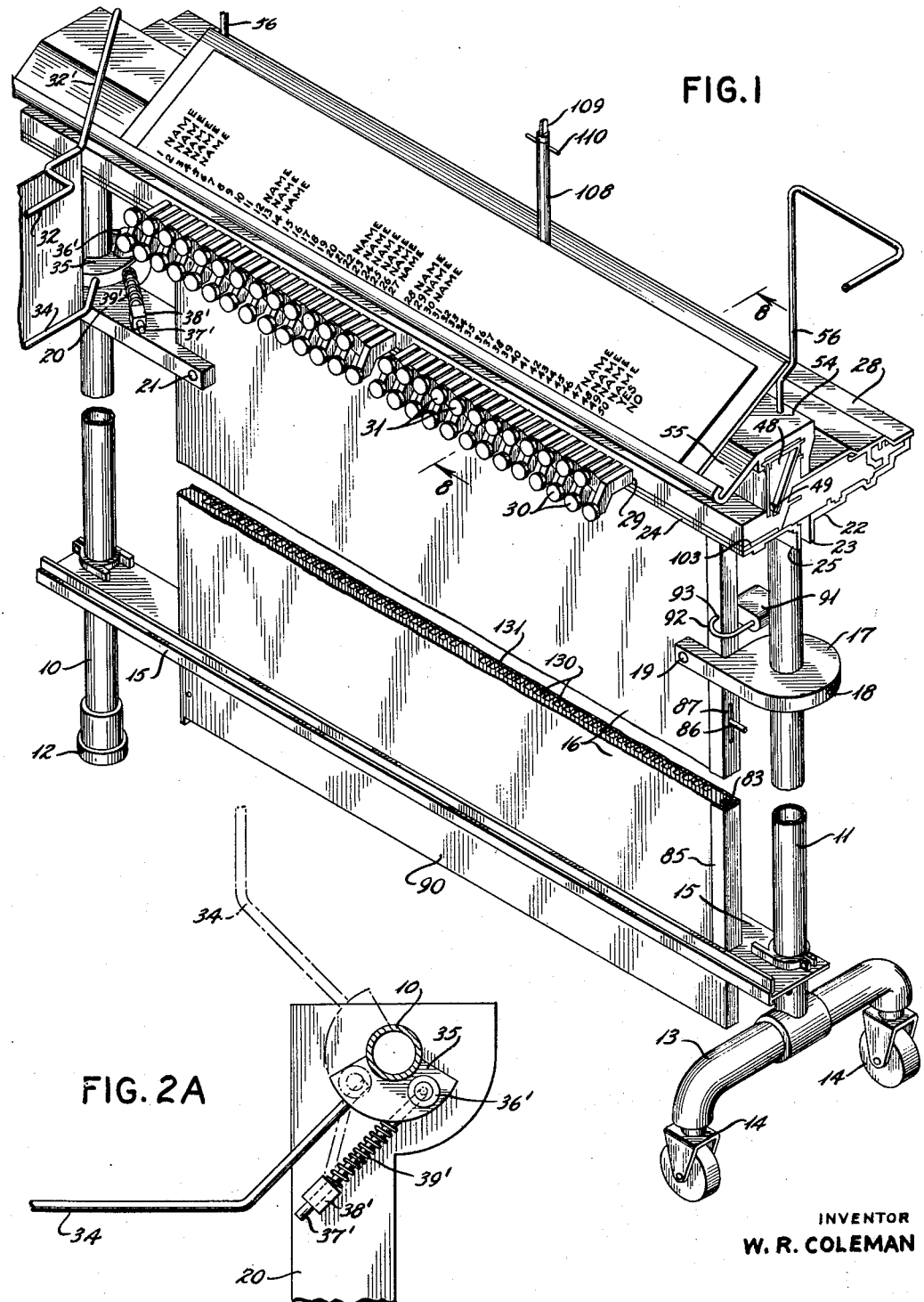

April 2, 1963 W. R. COLEMAN 3,083,899
VOTING MACHINE
Filed March 14, 1958 7 Sheets-Sheet 2
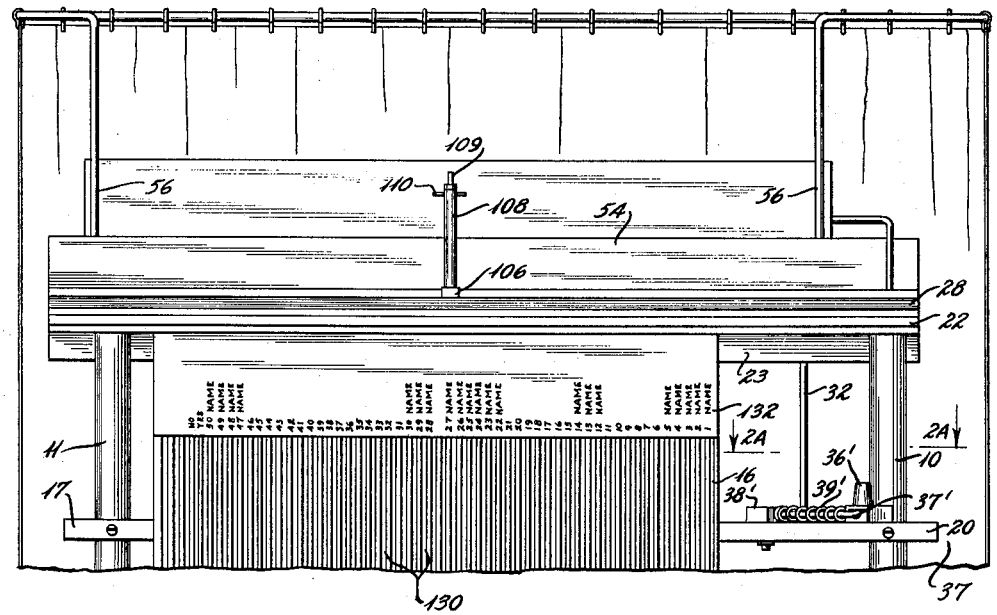
FIG. 2
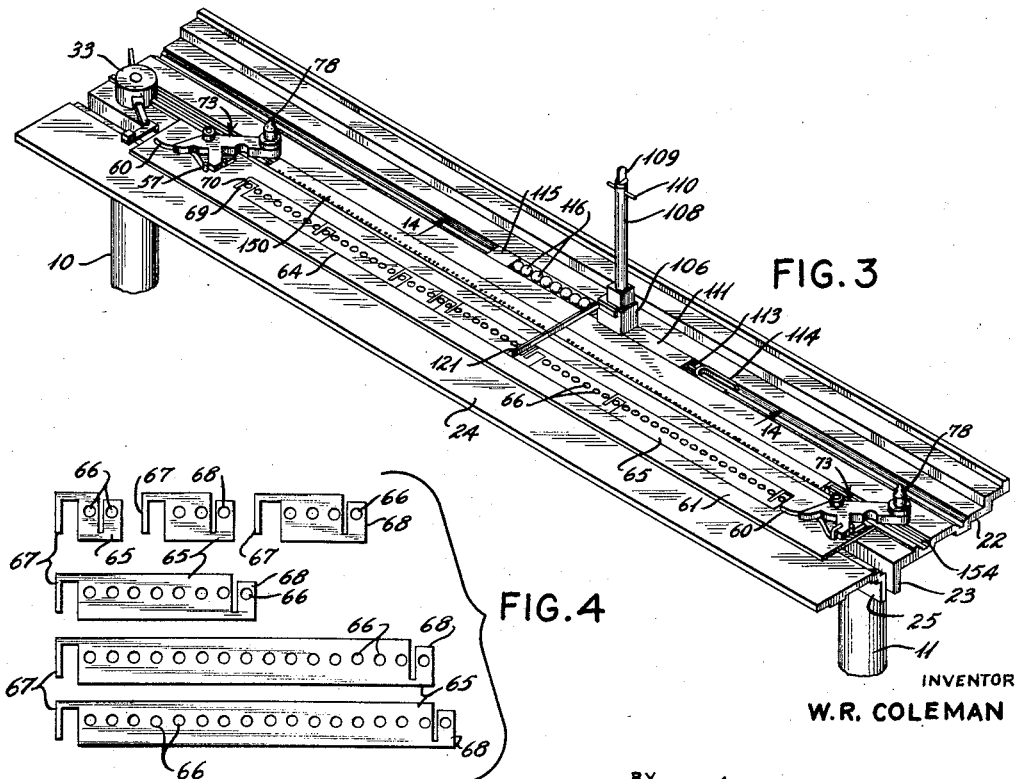
FIG. 3
FIG. 4
INVENTOR
W.R. COLEMAN
BY *A. Yates Dowell*
ATTORNEY

INVENTOR
W.R. COLEMAN

BY [signature]
ATTORNEY

April 2, 1963 W. R. COLEMAN 3,083,899
VOTING MACHINE
Filed March 14, 1958 7 Sheets-Sheet 4

INVENTOR
W. R. COLEMAN
BY
ATTORNEY

April 2, 1963 W. R. COLEMAN 3,083,899
VOTING MACHINE

Filed March 14, 1958 7 Sheets-Sheet 5

INVENTOR
W. R. COLEMAN

BY
ATTORNEY

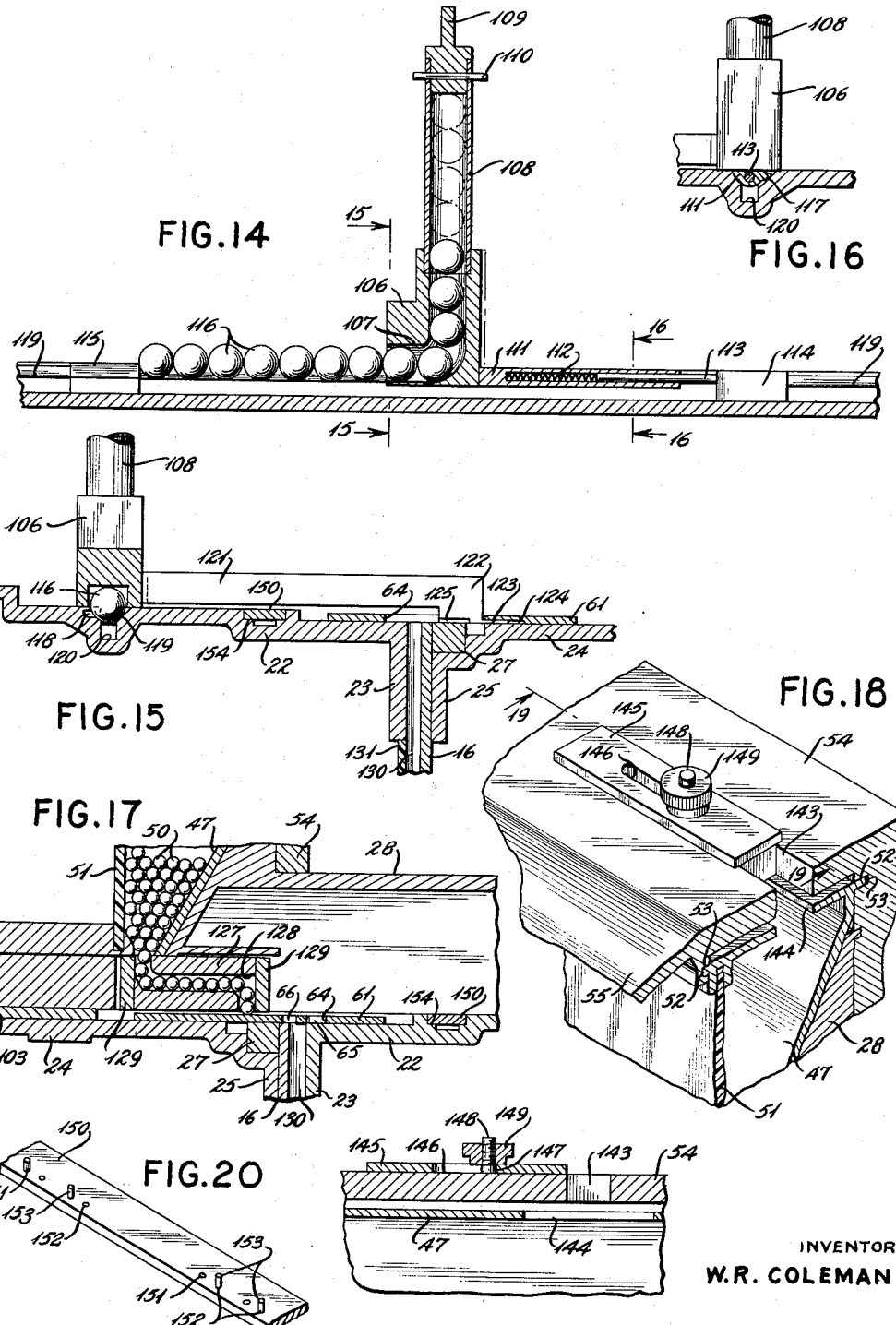

April 2, 1963     W. R. COLEMAN     3,083,899
VOTING MACHINE

Filed March 14, 1958     7 Sheets-Sheet 7

INVENTOR
W. R. COLEMAN
BY
ATTORNEY

United States Patent Office 3,083,899
Patented Apr. 2, 1963

3,083,899
VOTING MACHINE
William R. Coleman, 1045 S. 31st St., Birmingham, Ala.
Filed Mar. 14, 1958, Ser. No. 721,536
7 Claims. (Cl. 235—53)

This invention relates to calculators, recorders and the like machines employed in the calculating and recording of various phenomena, including the tabulation of votes in an election for office and some of which machines are portable or may be easily transported.

The invention is concerned particularly with portable voting machines which can be installed and made ready so that all that is necessary to cast a vote is the operation of a turnstile, the moving of a barrier or the like by the voter when placing himself in a position to vote, and which vote is recorded and the machine rendered inoperative by the moving of the barrier as the voter leaves the voting booth or area.

Voting machines heretofore in use have been complicated, expensive, cumbersome, heavy, impractical, unreliable, permitted tampering, and were subject to frequent breakdowns. Also they presented limitations on the number and selection of condidates.

It is an object of the invention to provide a voting machine which is relatively simple, inexpensive, lightweight, compact, and easy to maintain, as well as a machine which is foolproof, will satisfactorily perform the function for which it was designed, will accurately record both the number of voters and the votes on one or several tickets.

Another object of the invention is to provide a machine which can be readily stored, transported, set up for operation, adjusted for use when one or more than one party is involved, and by which the splitting of a ticket as for example at a primary can be prevented, as well as a machine which will be adjusted to permit the splitting of a ticket as for example at a general election.

Another object is to provide a machine of the character indicated in which the keys are located in a definite easily accessible position where they readily can be recognized and operated with a minimum of effort in a minimum time.

Another object of the invention is to provide a voting machine having a multiple key interlock so that the voter will be required to cast the indicated number of votes of a group as well as a machine in which the keys will be returned to their initial position when the voter leaves the booth so that such keys will then again be operative.

A further object of the invention is to provide a voting machine having a total vote counter and in which the count and the indication thereof is visible and determinable at a glance.

A further object of the invention is to provide a voting machine capable of adaptation to the desired number of candidates, which is entirely mechanical in its operation without requiring electrical or other outside energy and in which the vote is visible and can be photographed to permanently record the results of the voting.

Figure 5:
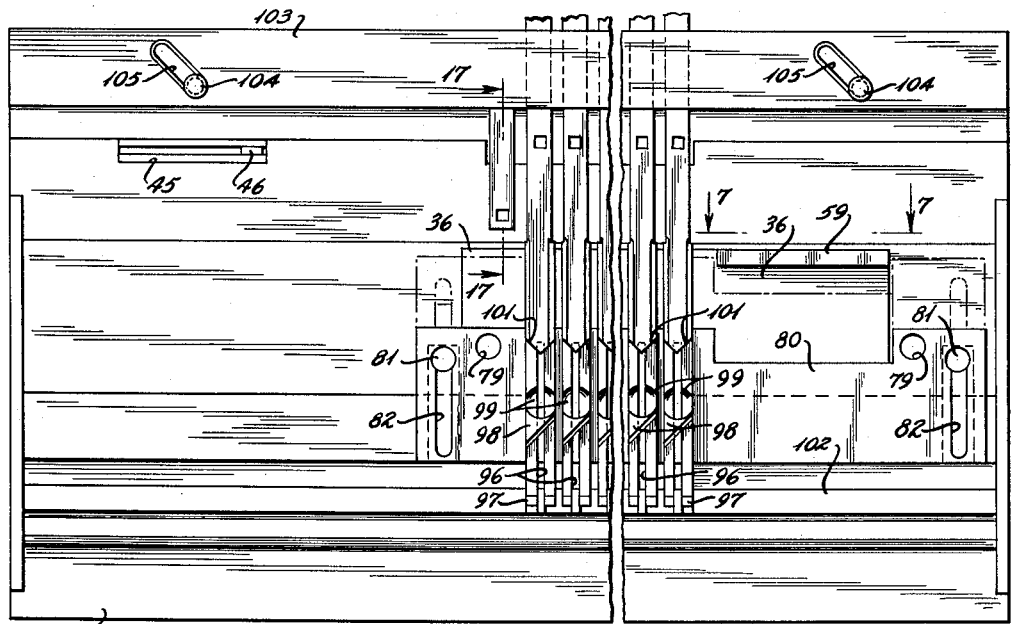
Figure 6:
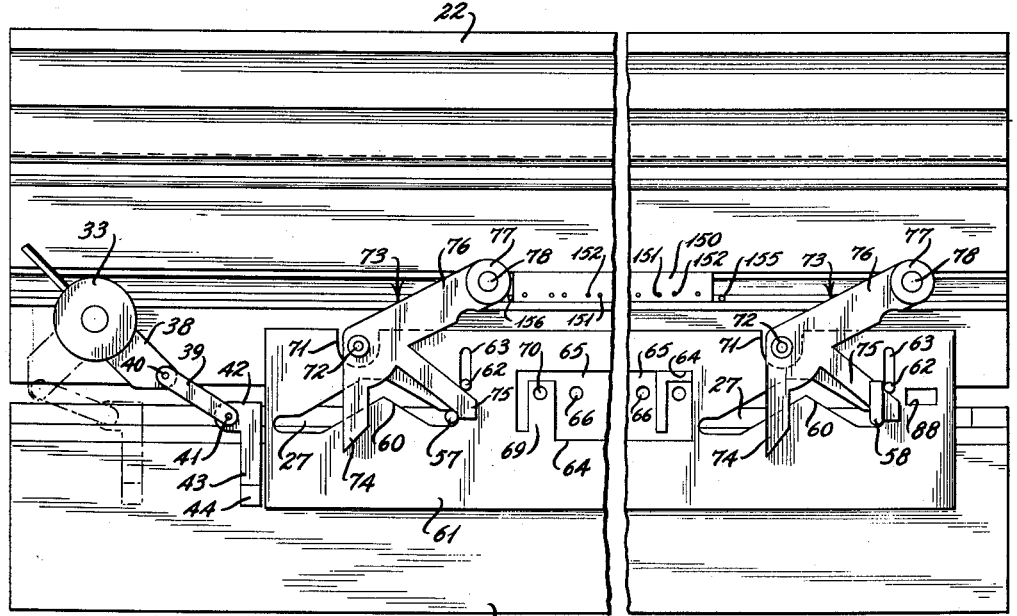
Figure 7:
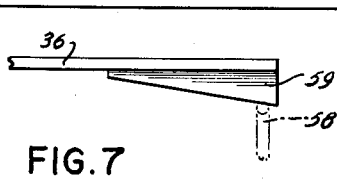
Figure 8:
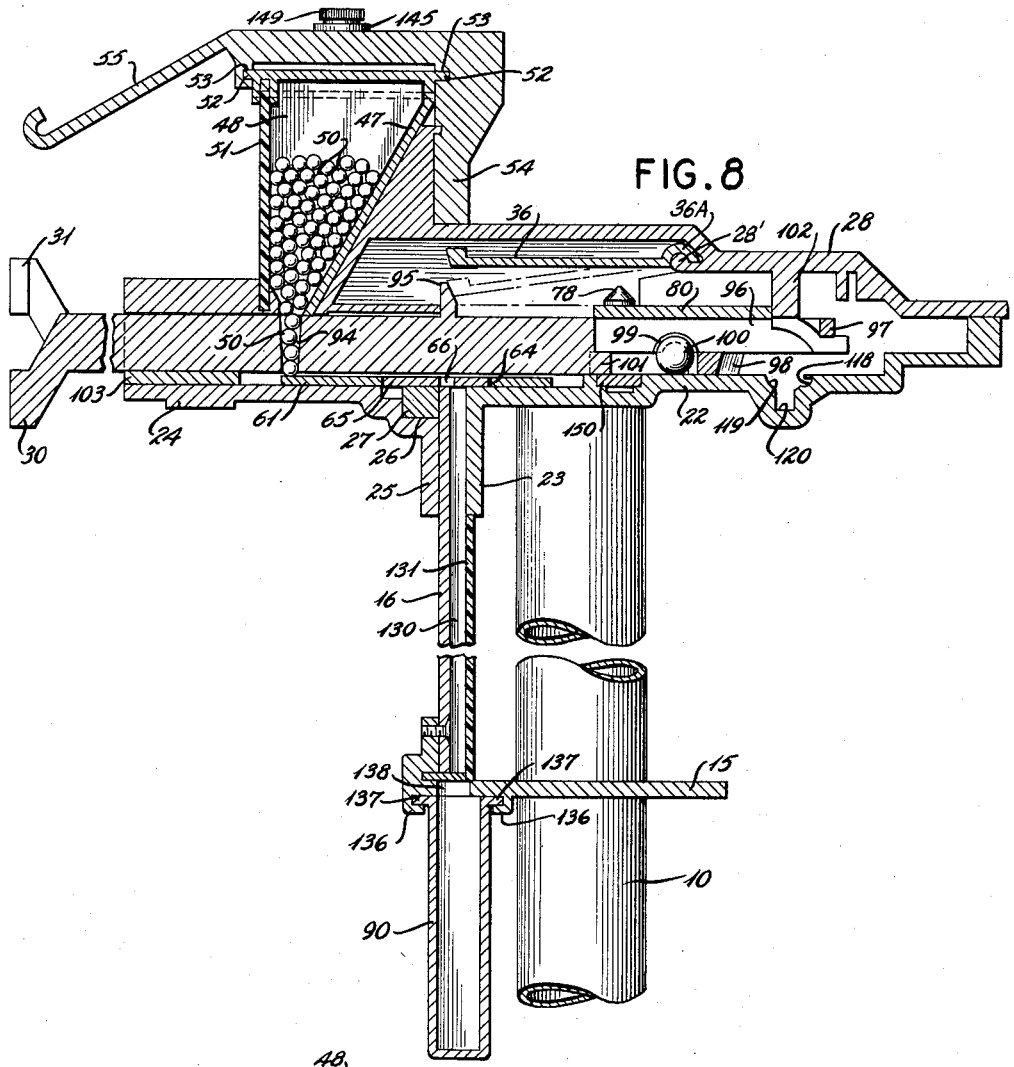
Figure 9:
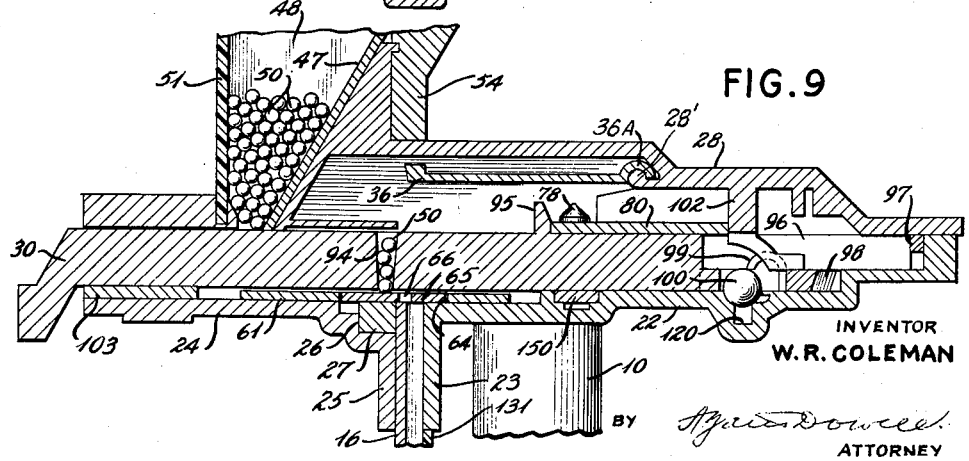
Figure 10:
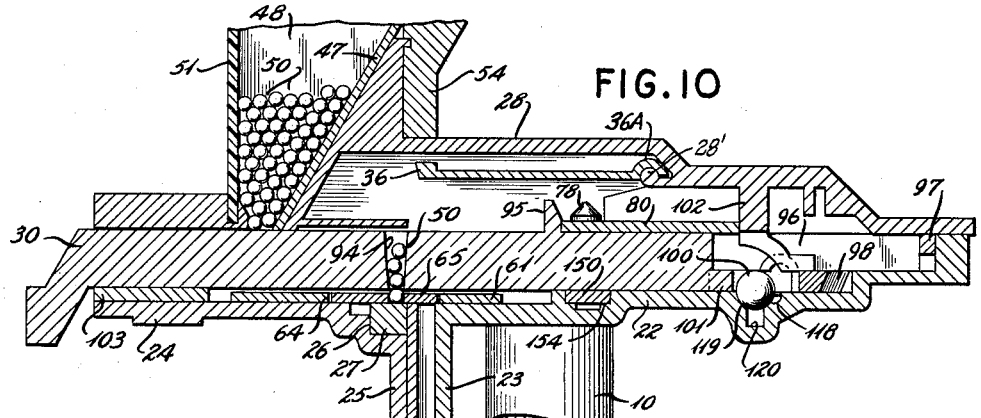
Figure 11:
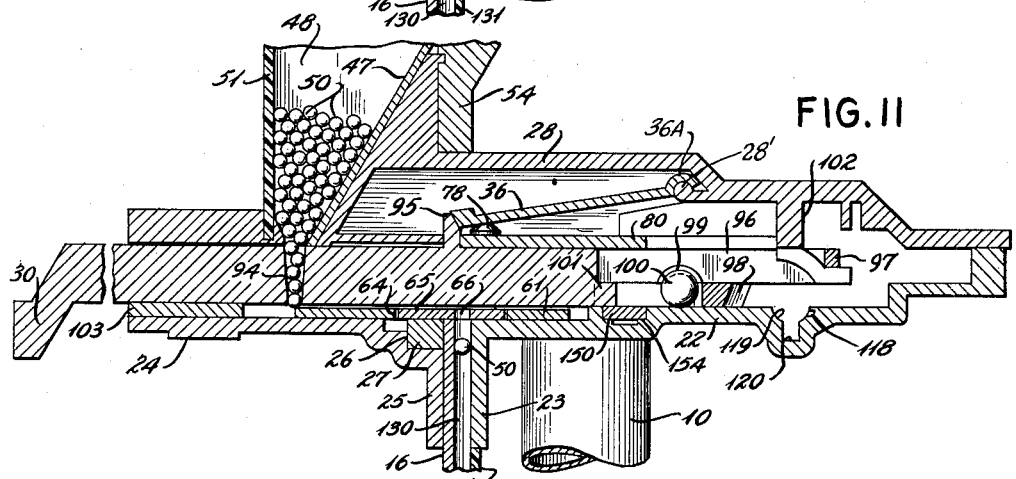
Figure 12:
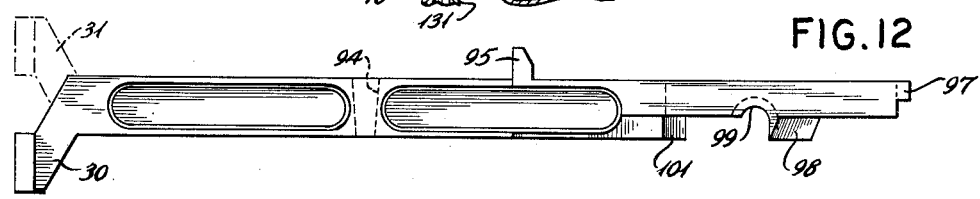
Figure 13:
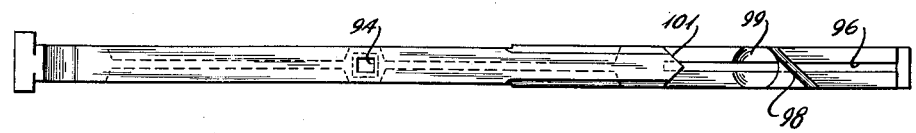
Figure 21:
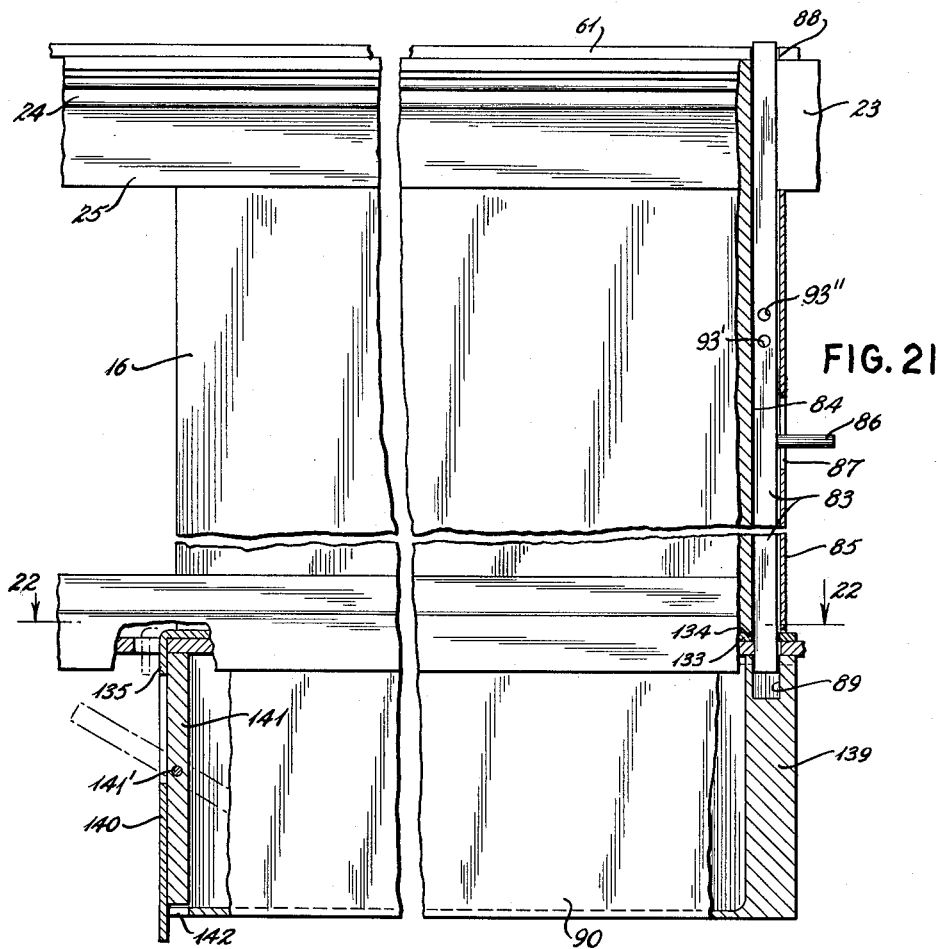
Figure 22:
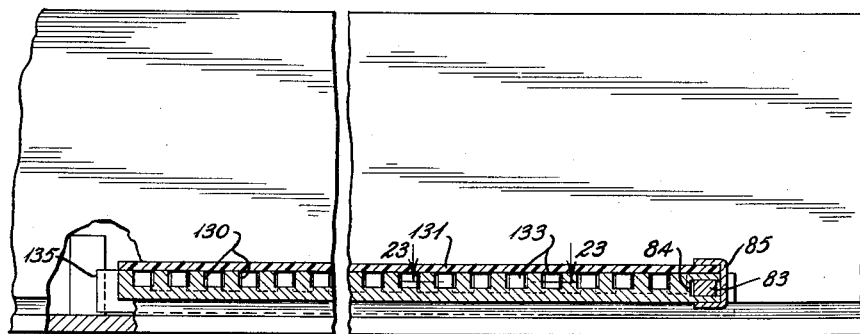

Further objects and advantages of the invention will be apparent from the following description taken in conjunction with the accompanying drawings wherein:

FIG. 1 is a perspective illustrating one application of the invention;

FIG. 2, a fragmentary rear elevation;

FIG. 2A, an enlarged fragmentary section on the line 2A—2A of FIGURE 2;

FIG. 3, a fragmentary perspective of the body of the machine with the head removed;

FIG. 4, a detailed elevation of the transfer slides;

FIG. 5, a fragmentary enlarged bottom plan view of the head;

FIG. 6, a fragmentary top plan view of the body which coacts with the structure of FIG. 5;

FIG. 7, a detail of one of the cams taken on the line 7—7 of FIG. 5;

FIG. 8, a section on the line 8—8 of FIG. 1 with the control gate closed;

FIG. 9, a view similar to FIG. 8 with the gate half open;

FIG. 10, a view similar to FIG. 8 with the gate three quarters open;

FIG. 11, a view similar to FIG. 8 with the gate opened and locked;

FIG. 12, a side elevation of one of the keys;

FIG. 13, a bottom plan view of the key of FIG. 12;

FIG. 14, a detailed section on the line 14—14 of FIG. 3;

FIG. 15, a section on the line 15—15 of FIG. 14;

FIG. 16, a section on the line 16—16 of FIG. 14;

FIG. 17, a section on the line 17—17 of FIG. 5;

FIG. 18, a fragmentary detailed perspective of the access opening and closure therefor;

FIG. 19, a section on the line 19—19 of FIG. 18;

FIG. 20, a fragmentary detail of the primary election slide;

FIG. 21, an enlarged fragmentary detail of the body portion of the device with parts broken away and with the locking means exposed;

FIG. 22, a section on the line 22—22 of FIG. 21; and

Figure 23:
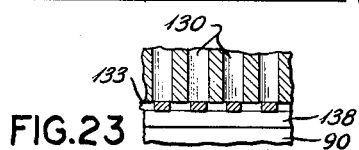

FIG. 23, a section on the line 23—23 of FIG. 22.

Briefly stated, the present invention is a voting machine having a supporting structure on which is mounted a magazine containing a head and a ball collecting body. Counters are provided in the form of small spherical bodies or balls which are adapted to be released from the magazine in the head and transferred to channels in the body by means of individual selector keys and cooperating slides. The channels in the body may be designated to represent a particular candidate. The machine is provided with a lock controlled by a gate or lever operated by a voter entering and leaving the booth or other voting area. The machine is so constructed that it precludes disobedience of instructions as to the number of candidates of a group for which votes must be cast. For example, where there is a group of eight candidates for which it is necessary to cast four votes, the mechanism is so constructed that four votes and exactly four votes must be cast, neither more nor less.

The voting machine is completely mechanical with balls which fall by gravity not requiring electrical or other outside energy other than operation by the voter and in which machine the balls are visible and capable of being photographed after the vote is taken to make a permanent record, the machine being foolproof and preventing tampering or changing of the vote.

With continued reference to the drawings the voting machine of the present invention comprises a pair of upright posts 10 and 11. Post 10 has a foot 12 at its lower extremity and post 11 has cross arm 13 at its lower extremity to which is attached a pair of caster wheels 14, one on each end of cross arm 13.

Cross bar 15 connects posts 10 and 11 near their lower ends and supports ball collector 16 of the machine. Collar 17 is mounted on post 11 by means of set screw 18 and is attached to ball collector 16 in any desired manner as by screw 19. Collar 20 is mounted on post 10 opposite collar 17 and is attached to ball collector 16 by means of screw 21.

The upper extremities of posts 10 and 11 support receiver plate 22 provided with depending flange 23 which is attached to and supports the upper end of ball collector 16 at the rear face thereof. Slide support plate 24 is jointed to the ball collector by depending flange 25 and is provided with groove 26 which forms a guideway for slide bar 27. The receiver plate and the slide support plate form a cross head assembly which is covered by key frame 28.

Key frame 28 may have a series of slots or grooves 29 in which keys 30 and 31 are individually operable. Keys 30 may have downwardly offset portions with forwardly extending faces for the reception of numbers or other information-bearing indicia and keys 31 may have upwardly offset portions with forwardly extending faces for the reception of similar indicia.

The machine as shown in FIG. 1 may have at its left side, an operating gate or lever 32. Upper arm 32' of the gate may be indexed in plug 33 rotatable in the upper end of post 10 and lower arm 34 may be fixed to a semicircular, relatively flat toggle support member 35 having boss 36' adapted to receive an upturned end of toggle bar 37'. The opposite end of the toggle bar is slidably carried by block 38' which is pivotally mounted on collar 20. Spring 39' may be mounted around toggle bar 37' intermediate block 38' and toggle support member 35 to provide an overcenter toggle action to maintain the gate in either open or closed position.

When the gate is open, keys 30 and 31 are held in inoperative position by key locking bar 36 (FIGS. 5, 8, 9, 10, 11) one side of which is provided with an arcuate portion 36A pivotally engaging a hinge pin 28' on the key frame 28 the opposite side of which has an enlargement for engaging a lug carried by each of the keys 30 and 31. A voter entering the booth must close the gate which closes curtain 37 (FIG. 2) by a conventional mechanism not shown and the closing of the gate places the machine in operative condition as will be later described. Plug 33 may have lug 38 attached thereto and link 39 may have one end attached by pivot 40 to the end of lug 38 and the other end attached by pivot 41 to short end 42 of generally L-shaped raised portion 43 of slide bar 27. The long end of the raised portion 43 may have lug 44 adapted to pass through slot 45 (FIG. 5) in key frame 28 and engage notch 46 in the bottom of ball magazine 47 to cause agitation of such ball magazine.

Ball magazine 47 has end plates 48 (FIGS. 1 and 8) pivotally attached to the upper portion thereof and stops 49 attached to the lower portions to prevent such end plates from being forced open by the weight of small balls 50. Magazine 47 is preferably closed in front by a sheet of clear plastic, glass or other transparent material 51 and may have a pair of extensions 52 along its upper edge for sliding in grooves 53 of a ballot-carrying member 54 which is attached to key frame 28. Member 54 may have a forwardly and downwardly extending portion 55, the end of which may be hook-shaped, to support a ballot of candidates and the rear portion of such member may hold rods 56 which support curtains 37.

Slide bar 27 also may have pins 57 and 58 attached thereto, one adjacent each end, with pin 58 having a bent over portion adapted to engage cam surface 59 (FIGS. 5 and 7) depending from key locking bar 36. When the slide bar 27 is moved laterally the bent over portion of pin 58 will move lengthwise of the cam surface 59 to raise the key locking bar 36 out of engagement with keys 30 and 31. Pins 57 and 58 are slidable within cam grooves 60 in ball transfer slide 61 which is restrained from endwise movement by pins 62 attached to receiver plate 22 and slidable within slots 63 in ball transfer slide 61. Such slide having an enlarged slot 64 adapted to receive interchangeable inserts 65 having ball-receiving openings 66 therein. Inserts 65 may have 2, 3, 4, 8, 16, or 17 ball openings 66 as shown in FIG. 4 and each may have L-shaped extension 67 on one end and cooperating lug 68 on the opposite end to provide an interlocking means between adjacent inserts when desired. The ball receiving openings 66 are evenly spaced along the length of the inserts 65 and the spacing between the first opening and the end of the insert adjacent to the L-shaped extension 67 is slightly greater than the spacing between the last opening in the cooperating lug and the end of the insert for a purpose which later will be described. Slot 64 may have ear 69 adjacent one end with ball receiving opening 70 therein to provide an interlock between ball transfer slide 61 and interchangeable inserts 65.

Ball transfer slide 61 may have a pair of notches 71 so that such slide may by-pass a pair of pivot pins 72 on which are mounted a pair of key return cams 73 each of which has a pair of arms 74 and 75 which engage slide bar pins 57 and 58 to rotate arms 76. Raised portion 77 on the outer end of each of arms 76 are adapted to receive pins 78 which are retained in openings 79 (FIG. 5) in key return slide plate 80. Plate 80 is slidably attached to key frame 28 by pins 81 located in slots 82 in such key return slide plate.

The closing of the gate causes slide bar 27 to move laterally to unlock keys 30 and 31 and move key return slide plate 80 to its rearmost position as shown in FIG. 8.

The machine may be locked against any unauthorized use by means of locking bar 83 (FIGS. 1, 21, and 22) slidable in groove 84 in one edge of the ball collector 16 and housing 85 attached to the front and back of the ball collector in any desired manner. Pin 86 is carried by locking bar 83 and is slidable in groove 87 in housing 85. The upper end of locking bar 83 passes through opening 88 in ball transfer slide 61 and the lower end is retained in hole 89 (FIG. 21) in ball reservoir 90 at the bottom of the machine.

In order to lock the machine against unauthorized use, a lock 91 (FIG. 1) is provided having a hasp 92 adapted to pass through an opening 93 in the housing 85 and an opening 93' in the locking bar 83 to prevent lateral movement of either the ball transfer slide 61 or the ball reservoir 90. To prepare the machine for an election, the lock 91 is removed and the locking bar 83 is moved downwardly into the opening 89 in the ball receptacle 90 so that the upper end of such locking bar is retracted from the opening 88 and the transfer slide 61 is free to move laterally. In this position the ball reservoir 90 is still locked against lateral movement, and to prevent tampering during the election, the locking bar 83 has a second opening 93" which may be aligned with the openings 93 in the housing 85 and through which the lock hasp may be inserted and locked.

When the ball transfer slide 61 has been unlocked and the gate closed by a voter, the machine is then in operable condition. The voter pushes the keys corresponding to the candidate of his choice as indicated on the ballot. Keys 30 and 31 are provided with square tapered holes 94 adapted to contain counter balls 50 which are fed by gravity from ball magazine 47. Lug 95 is provided at the top of each of the keys to facilitate the key return and locking means. Each key has slot 96 located centrally of the key adjacent the rear and extending forwardly approximately ⅓ the length of the key. The rear of slot 96 is closed by cross member 97. Midway of the bottom of the slot, the key has a depending angular scoop member 98 and a recess 99 adapted to contain a ball 100. At the forward end of the slot, the lower portion of the key has a wedge-shaped projection 101 the function of which will be described later.

The key frame may have a depending L-shaped member 102 the lower portion of which may be slotted to receive and support keys 30 and 31 by cross members 97 when the key frame is separated from the cross head assembly. Counter ball retainer slide 103 is slidably attached to key frame 28 by pins 104 set in grooves 105 in such a manner that when slide 103 is in its rearmost position counter balls 50 will not fall out when key frame 28 is separated from the cross head assembly.

When a ballot specifies that a predetermined number of candidates be selected from a group (as an example, seven candidates running for four offices on the school board, means must be furnished to limit the selections to the prescribed number. In order to do this, a multiple key interlock assembly is provided (FIGS. 1, 2, 3, 14, 15 and 16) and includes a body 106 having an upwardly curved ball receiving opening 107. The body 106 has a vertically disposed sleeve or tubular member 108 mounted thereon in communication with the opening 107 and the upper end of such tubular member is closed by a plug 109 maintained in fixed position by a pin 110.

A laterally disposed arm 111 is attached to the body 106 on the side opposite the opening 107 and such arm has a hole or recess drilled in its free end for the reception of a spring 112 and an outwardly projecting pin 113. The body 106 and arm 111 are slidably received within an arcuate ball track 19 having a recess 120 located within the receiver plate 22. Such body and arm are retained within the ball track 119 by a lug 117 carried by the arm 111 and slidably received within a groove 118 (FIGS. 15 and 16). The free end of the pin 113 bears against the bight portion of a U-shaped stop member 114 to cause the spring 112 to urge the body 106 to the left as viewed in FIG. 14. The stop 114 is located within the recess 120 and is constructed of spring material so that the legs of the U-shaped stop will frictionally engage the sides of such recess with sufficient force to hold the stop in position against the tension of the spring 112. A second stop member 115, of a construction similar to the stop 114, is positioned within the recess 120 on the opposite side of the body 106 and in spaced relation thereto. A predetermined number of balls 116, of substantially the same size as the balls 100, are placed within the ball track 119 intermediate the stop 115 and the body 106. If desired, some of the balls 116 may be located within the ball receiving opening 107 in the body as well as within the tubular member 108. It is noted that the space remaining in the body 106 and the tubular member 108 is not quite sufficient to accept a number of additional balls equal to number of candidates to be selected.

An arm 121 is attached at one end to the body 106 and the free end of such arm has a depending portion 122 terminating in a forwardly extending tip 123 which engages an undercut portion 124 (FIG. 15) in the ball transfer slide 61. The insert 65 or combination of inserts having a number of openings corresponding to the number of candidates to be selected, is disconnected from the remaining inserts and inverted (FIG. 3) so that the ball receiving openings 66 will not be in alignment with the holes 94 in the keys 30 and 31.

The inverted insert is adapted to be connected to the arm 121 so that when the desired number of keys have been operated, the arm will move the insert into alignment with the holes 94 in the keys to receive balls 50 therefrom. In order to connect the arm and the insert, the depending portion 122 of the arm has a lug 125 extending laterally therefrom and such lug is snugly received within the space between the insert 65 and the L-shaped extension 67 on the end thereof. As the candidates are selected, the corresponding key is pushed in and the angular scoop member 98 engages the balls 116 and forces such balls apart. Since the balls 116 are prevented from moving in one direction by the stop 115, the angular member will force the balls through the body 106 and into the tubular member 108. When the operated key is fully pushed in, the ball 100 carried thereby will be deposited in the ball track 119 so that the balls 116 cannot return to their initial position. Balls 116 continue to be forced up the tubular member 108 until the correct number of keys have been operated. The space within the tubular member 108 is completely filled before the key representing the last candidate to be selected from the group has passed through the balls 116. When such key is completely pushed in, the balls 116 force the body 106 to assume the position indicated in phantom in FIG. 14 against the pressure of the spring 112. The lateral movement of the body 106 causes the arm 121 to move the reversed insert 65 to align the openings in the insert with the holes 94 in the keys so that the transfer slide can remove the balls 50 from the keys when such slide is operated.

It will be apparent that too many candidates cannot be selected since too many keys of the group cannot be operated due to the balls 116 forming an obstruction. In the event that not enough candidates are chosen, the reversed insert 65 will not be moved laterally to align the openings therein with the holes in the keys and the votes of that group will not be registered.

When the gate opens pins 57 and 58 of slide bar 27 engage cam groove 60 which causes ball transfer slide 61 to move forward as shown in FIG. 10 so that balls 50 will fall by gravity into opening 66. Further opening of the gate will cause ball transfer slide 61 to move rearwardly until balls 50 drop into ball collector 16 (FIG. 11).

As the gate is opened pins 57 and 58 contact arms 74 of key return cams 73 and cause key return slide plate 80 to push against lugs 95 and return keys to their original position. As the keys are being returned angular scoop members 98 contact balls 100 and pull them out of ball track 119 so that balls 116 may fall by gravity from tubular member 108 and fill the spaces occupied by balls 100.

Adjacent one side of the bank of keys 30 and 31 is a total number of voters designator (FIG. 17) which comprises block 127 having Z-shaped passageway 128 and end members 129 attached to key frame 28 in any desired manner. Passageway 128 is adapted to receive balls 50 from magazine 47. The length of the passageway is the same as the distance which the keys travel so that the discharge opening is in alignment with square tapered holes 94 of the keys when the keys have been pushed in. Thus it will be apparent that each time the gate is opened and the ball transfer slide moves forward to receive balls from the keys, the slide will automatically take a ball from the total number of voters designator and deposit it in the ball collector.

Ball collector 16 may have a series of grooves 130, one for each of the keys and one for the total number of voters designator. Grooves 130 may be covered with a sheet of clear plastic, glass or other transparent material 131 and may have spaced markings thereon which indicate the number of votes cast for each candidate. Ballot 132 (FIG. 2) may be attached to the top of the ball collector to assist in associating the proper groove 130 with its respective candidate.

If desired pictures may be taken of the ball collector as the voting progresses and when all votes are cast. This would provide a permanent step by step record, which could be used as evidence, of the way the vote was cast. Also it would indicate any unusual happenings or trends such as an attempt to stuff the ballot box.

Serrated slide plate 133 is held in locked position immediately below ball collector 16 in such a manner that balls falling through grooves 130 will be stopped by plate 133. Such plate may have an opening 134 (FIG. 21) in one end for the reception of locking bar 83 and a downturned portion 135 at its opposite end to provide a finger grip so that sliding plate 133 may be moved after the vote is tabulated to permit counter balls 50 to fall into ball reservoir 90.

Cross bar 15 has a pair of L-shaped brackets 136 depending from its lower surface which form a slideway for flanges 137 extending outwardly from ball reservoir 90. Slot 138 (FIG. 8) is provided in cross bar 15 intermediate brackets 136 and beneath serrated slide plate 133 so that no obstruction is offered to the passage of the balls from ball collector 16 to ball reservoir 90 when plate 133 is moved.

Ball reservoir 90 (FIG. 21) is a relatively long, narrow, hollow box having a thick end wall 139 at one end to accommodate hole 89 which is adapted to receive locking bar 83. The opposite end of such ball reservoir may have end plate 140 across the lower portion thereof which extends a short distance below ball reservoir. Pivot plate 141 mounted by means of pin 141' may be located interiorly of end plate 140. The upper portion of plate 141 abuts downturned portion 135 of serrated slide plate 133 and the lower portion covers aperture 142 in the bottom of ball reservoir 90.

In order to return balls 50 to magazine 47 when the vote has been tabulated, locking bar 83 is raised out of engagement with ball reservoir 90 and serrated slide plate 133. The downturned finger gripping portion 135 may then be grasped to move serrated slide plate 133 until openings in such serrated slide plate are substantially in alignment with grooves 130 of ball collector 16 at which time balls 50 will fall into ball reservoir 90. The ball reservoir may then be slid from under cross bar 15 and raised to the top of the machine. Opening 143 in ballot carrying member 54 (FIGS. 18 and 19) and opening 144 in ball magazine 47 are closed by cover plate 145 which may have slot 146 slidable on square shank 147 of stud 148, the upper end of which is threaded to engage lock nut 149. Cover plate 145 is then opened to expose opening 143 and the extension of end plate 140 is inserted in such opening. Ball reservoir 90 is then tilted up and plate 141 is pivoted to the position shown in phantom in FIG. 21 to permit balls 50 to roll though aperture 142 and into ball magazine 47. When all the balls are out of ball reservoir the reservoir may be returned to its position below cross bar 15 and locked in position and cover plate 145 may be returned to its position over opening 143.

When the machine is to be used in a two party primary election, means must be provided to limit the voters to voting for one party only. In order to accomplish this, the candidates are divided into their respective parties and a party selector slide 150 (FIG. 20) is provided having left hand holes 151 and right hand holes 152 for each key spaced apart a distance less than the width of the key and on opposite sides of the center line thereof. Pins 153 are snugly received in the left hand holes 151 for one party and the right hand holes 152 for the other party. The voter selects the party for whom he wishes to cast his vote and when he pushes a key, the wedge shaped projection 101 of the first key he has pushed strikes the pin 153 and causes party selector slide 150 to move laterally to allow key to pass. Subsequent voting must be for the same party since the first key moves the party selector slide to one side and locks such slide against return until the obstructing key has been removed and keys for the opposing party cannot pass pins 153 and cannot push them out of the way. When the voter has selected the candidates of his choice and has pushed the appropriate keys, his vote is registered when he opens the gate to leave the booth. If the next voter wishes to vote for the same party, the party selector slide obviously remains where it is, however, if the next voter wishes to vote for the opposite party, the projection 101 on the first key that he pushes will strike the pin 153 and move the selector side to the opposite side. Party selector slide 150 is adapted to be slidably retained in guide 154 in receiver plate 22 and its endwise movement is limited by stops 155 and 156 (FIGS. 3 and 6).

In the operation of the machine, the voter enters the booth and closes gate 32. The closing of the gate energizes a conventional mechanism (not shown) which closes curtain 37. The gate also causes movement of slide bar 27 which raises key locking bar 36 unlocking the keys 30 and 31, returns key return slide plate 80 to its retracted position and moves ball magazine 47 causing agitation of counterballs 50 to make certain that square tapered holes 94 in keys 30 and 31 are filled.

The machine is then in operable condition and the voter pushes the keys corresponding to the candidates of his choice as indicated on the ballot carried near the top of the machine. The square tapered holes 94 in the keys carry counterballs 50 along a portion of the top surface of ball transfer slide 61. In the event the voter changes his mind or pushes the wrong key by mistake, he may pull the key out again without registering a vote for that candidate.

When a ballot calls for a specific number of candidates to be selected for an office as for example representative from a district to the state governing body, that number of votes must be cast. A multiple key interlock assembly is provided so that more than the specified number of votes cannot be cast and less than the specified number will not be registered.

After the voter has made his selections and pushed the corresponding keys, he opens the gate and leaves the booth. The opening of the gate causes curtain 37 to open and the ball transfer slide to move forward so that the lowest balls 50 in square tapered holes 94 will fall by gravity into ball-receiving openings 66 in interchangeable inserts 65 carried by ball transfer slide 61. Ball transfer slide 61 is then caused to move rearwardly by cam grooves 60 until ball-receiving openings 66 are in alignment with grooves 130 of ball collector 16 at which time they will fall by gravity down grooves 130 until their descent is arrested by serrated slide plate 133.

Simultaneously the ball transfer slide automatically receives a ball from the total number of voters designator and deposits such ball in the total number of voters groove of the ball collector 16.

After the ball transfer slide has taken a ball from each of the depressed keys and from the total number of voters designator, the keys are returned to the out position by key return slide plate 80 and locked by key locking bar 36 until such time as the gate is closed again and the cycle repeated.

When the last vote has been cast and the vote tabulated, the serrated slide plate 133 is moved to allow balls 50 to drop into ball reservoir 90. The ball reservoir is then removed from the machine and the balls returned to ball magazine 47.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A voting machine having a gate to be operated by a voter, said voting machine including supporting structure, an elongated ball collector having spaced upright slots carried by such supporting structure, an elongated receiver plate, and an elongated slide support plate mounted on the upper end of said supporting structure and forming a crosshead above said ball collector, an elongated key frame having a plurality of individually operable selector keys mounted for transverse movement therein and supported by said crosshead, an elongated ball magazine carried by said key frame above said keys and having a laterally elongated discharge opening, a plurality of balls in said magazine, each of said keys having an aperture into which said balls may fall by gravity from said magazine in a normal position of the keys and moving said balls transversely upon the operation of said keys, a laterally adjustable ball transfer slide intermediate said keys and said collector and transversely reciprocable by said gate for receiving said balls from the selector keys which have been operated and for moving said balls transversely into position to fall by gravity into corresponding slots in said collector, means operable by said gate for restoring and locking said keys to normal position when said gate is opened, a multiple selector key interlock mounted on said receiver plate, said interlock comprising a body having a laterally directed ball receiving opening, a tubular member closed at one end and mounted vertically on said body in communication with said ball receiving opening, a predetermined number of balls located in said receiver plate said body and said tubular member, a forwardly extending arm on said body adapted to engage said ball transfer slide, said slide having ball receiving apertures laterally spaced corresponding to the lateral spacing of the slots in said ball collector and the apertures in said keys, spring means for biasing the slide and the body and tubular members of the interlock laterally so that the ball receiving apertures are normally out of alignment with the apertures in said keys, each of said keys having a recess to accommodate a ball of the same size as said predetermined number of balls and an angular scoop member adjacent said recess, a ball in the recess of each key whereby when a key is operated the scoop member thereon will separate a predetermined number of balls and the ball in the recess will be added thereto until a predetermined number of keys have been operated whereupon the body and tubular member of the interlock and the slide engaged by said arm will be moved laterally to align the ball receiving openings in said slide with the opening in said keys so the vote can be registered upon reciprocation of said slide by said gate.

2. A voting machine having a gate operated by a voter comprising an elongated ball collector having spaced slots, a head mounted above said ball collector and having an elongated magazine for balls and an elongated opening, a plurality of balls in said magazine, individually operable selector keys mounted in said head for transverse movement and having vertical apertures for receiving said balls from said magazine in the normal position of the keys and moving said balls transversely upon operation of said keys, a laterally adjustable ball transfer slide intermediate said keys and said collector and transversely reciprocable by said gate and having openings therein for receiving balls from the keys which have been operated and moving said balls transversely into position to fall by gravity into corresponding slots in said collector, means operable by said gate for returning and locking said keys to their normal position when the voter operates said gate to leave the machine, an opening in said transfer slide for receiving a ball from said magazine and depositing it in one of said slots in said collector comprising an automatic counter of the total number of voters, slidable stop means in said ball collector to prevent the balls from falling beyond a predetermined position and a multiple selector key interlock comprising a body having a laterally directed opening, a tubular member on said body in communication with said opening, a predetermined number of balls carried by said body and said tubular member, an arm on said body adapted to engage and laterally adjust said ball transfer slide, means carried by each of said keys to cause a portion of said predetermined number of balls to advance until a selected number of keys have been operated before said slide is adjusted and the vote can be registered.

3. The structure of claim 2 in which each of said keys has a wedged shaped projection on the lower surface thereof and said head has a laterally directed slot beneath said keys and adjacent to said ball transfer slide, a laterally adjustable slide bar having a pair of openings adjacent each key mounted in said slot, a pin engageable by said wedge shaped projection selectively mounted in one of each pair of openings whereby the first key operated will move said slide laterally and limit subsequent selection to keys having the pin located in similar openings.

4. A voting machine having a gate operated by a voter comprising a supporting structure, a laterally elongated ball collector having spaced upwardly directed ball receiving slots mounted on said supporting structure, a laterally elongated head mounted on said supporting structure above said collector, a series of independently operable selector keys each having a substantially vertical aperture laterally aligned with one of the slots in said collector and mounted for transverse movement in said head, a laterally elongated ball magazine with a lower discharge opening supported on said head above said keys and storing a plurality of balls, and spaced transversely of said slots to permit said balls to fall by gravity into the apertures of said keys when said keys are in normal retracted position, said balls in said apertures being partially advanced towards said slots when said keys are actuated, a transversely shiftable ball transfer slide with a laterally elongated slot supported by said head intermediate said selector keys and said ball collector and operable by said gate, a plurality of independent selectively reversible inserts disposed within the slot of said ball transfer slide and being transversely shiftable therewith, said inserts having ball receiving openings laterally spaced apart a distance corresponding to said slots in said collector and being transversely reciprocable by said gate to a first terminal position in registry with the apertures of the actuated keys to receive the balls partially advanced thereby and to a second terminal position in registry with the ball receiving slots for discharging the received balls into said collector, the openings in said inserts being asymmetrically disposed with respect to the ends thereof and in lateral alignment with the apertures in said keys and the slots in said collector when the inserts face in one direction in the slot of said ball transfer slide and being out of alignment therewith when facing in the reverse direction therein; a multiple selector key interlock supported for lateral adjustment on a laterally extending channel in said head and comprising a body having a laterally directed ball receiving opening communicating with said channel, a tubular member mounted on said body in communication with said ball receiving opening and closed at its opposite end, said channel body and tubular member having a predetermined maximum ball capacity and being filled with a number of locking balls less than said capacity by the number of vote selections required to be cast by a voter, an arm on said body engageable with said reversed inserts, means carried by each of said selector keys to advance and deposit an additional locking ball in said channel upon actuation of said keys to cause said balls to advance into said body and tubular member until the required number of votes has been cast and the maximum capacity is reached, whereby said interlock is adjusted laterally to move said reversed inserts into alignment with the apertures in said keys and the slots in said collector so that the vote can be registered.

5. The structure of claim 4 including means operable by said gate for automatically returning and locking said selector keys to normal position when the gate is opened.

6. The structure of claim 4 including a transparent cover for the slots in said ball collector, and adjustable stop means carried by said collector to prevent said balls from falling beyond a predetermined position.

7. The structure of claim 6 including a series of indicating markers on said transparent cover.

References Cited in the file of this patent

UNITED STATES PATENTS

| | | |
|---|---|---|
| 656,713 | Boring | Aug. 28, 1900 |
| 667,807 | Swaren | Feb. 12, 1901 |
| 688,424 | Loe | Dec. 10, 1901 |
| 854,657 | Lorraine | May 21, 1907 |
| 964,986 | Lorraine | July 19, 1910 |
| 995,357 | Lausterer | June 13, 1911 |
| 1,081,952 | Gillespie | Dec. 23, 1913 |
| 1,187,948 | Wilkinson | June 20, 1916 |
| 2,437,521 | Gustavson | Mar. 9, 1948 |